(12) United States Patent
Derry et al.

(10) Patent No.: US 10,728,429 B2
(45) Date of Patent: Jul. 28, 2020

(54) SYSTEMS, METHODS AND APPARATUSES FOR FILM VIRTUAL PRODUCTION

(71) Applicant: Twentieth Century Fox Film Corporation, Los Angeles, CA (US)

(72) Inventors: Glenn Derry, Santa Clarita, CA (US); Robert Derry, Santa Clarita, CA (US); Alejandro Arango, Santa Clarita, CA (US); Gary Martinez, Santa Clarita, CA (US)

(73) Assignee: Twentieth Century Fox Film Corporation, Los Angeles, CA (US)

( * ) Notice: Subject to any disclaimer, the term of this patent is extended or adjusted under 35 U.S.C. 154(b) by 17 days.

(21) Appl. No.: 16/229,241

(22) Filed: Dec. 21, 2018

(65) Prior Publication Data

US 2020/0154004 A1 May 14, 2020

Related U.S. Application Data

(60) Provisional application No. 62/760,495, filed on Nov. 13, 2018.

(51) Int. Cl.
*H04N 5/222* (2006.01)
*H04N 5/232* (2006.01)
*H04N 5/262* (2006.01)

(52) U.S. Cl.
CPC ....... *H04N 5/2224* (2013.01); *H04N 5/23258* (2013.01); *H04N 5/2621* (2013.01)

(58) Field of Classification Search
CPC ............ H04N 5/2224; H04N 5/23258; H04N 5/2621; G06T 19/006; G06F 3/011
See application file for complete search history.

(56) References Cited

U.S. PATENT DOCUMENTS

| | | | |
|---|---|---|---|
| 8,964,052 B1 * | 2/2015 | Wooley | H04N 5/232 348/211.99 |
| 10,142,561 B2 * | 11/2018 | Reynolds | H04N 5/232 |
| 2013/0063558 A1 * | 3/2013 | Phipps | H04N 5/2224 348/43 |
| 2014/0378222 A1 * | 12/2014 | Balakrishnan | H04N 5/2224 463/31 |

OTHER PUBLICATIONS

OptiTrack by NaturalPoint, Insight VCS:Pro quick start guide, NaturalPoint, Inc. 2010 (Year: 2010).*

* cited by examiner

*Primary Examiner* — Albert H Cutler
(74) *Attorney, Agent, or Firm* — Farjami & Farjami LLP

(57) ABSTRACT

Systems, methods and apparatuses for film virtual production including a virtual camera including plural arms with map-able control buttons, at least one of which is pivotable and a retroreflective marker tree fixedly associated with one of the pivoting arms, the retroreflective marker tree virtually representing the virtual camera that is fixedly associated with one the arms, with a center node designating said virtual camera lens and with tree extensions representing position and orientation information for said virtual camera.

20 Claims, 17 Drawing Sheets

SYSTEMS, METHODS AND APPARATUSES FOR FILM VIRTUAL PRODUCTION

CROSS-REFERENCE TO RELATED APPLICATION

This application claims the benefit of priority to U.S. Provisional Application No. 62/760,495 filed Nov. 13, 2018, the disclosure of which is incorporated herein by reference in its entirety.

TECHNICAL FIELD

This invention relates generally to virtual production for film, e.g. feature films. More particularly, this invention relates to methods, systems and apparatuses for generation of such virtual production for films.

BACKGROUND OF THE INVENTION

Visual effects generation can involve one or more of a plurality of different system components, inclusive of cameras, lighting, recording systems, synchronization devices, wearable devices, markers, virtual devices, and viewing devices, among others. Visual effects have also played an increasing role in modern films, including use of various visual effects components in virtual production.

Virtual Production is the means, system, or set of processes by which computer-generated three dimensional environments, objects, and characters are integrated with a motion-capture based data record of movement, dimensions and spatial relationships.

Virtualization is accomplished by generalist means that vary according to the needs of the production, and may be suited to fully virtualized or hybridized productions that integrate live action photography, utilizing virtual cinematography, virtual camera operation, etc.

PRIOR ART FIG. 1 illustrates a comparison flow diagram of a traditional filmmaking process, shown generally at 12, and an exemplary virtual production process, shown generally at 14. Development in the context of traditional filmmaking 12 begins with a story, shown at 16, progresses to a preparation stage including activity by an art department, selection of locations and construction of sets, shown at 18, to production of a live action shoot, shown at 20, and to post production editing, shown at 22, and resultant movie production at 23. The illustrated FIGURE also illustrates possible roles for third party vendors, shown generally at 24, pulling and working with production material from the live action shoot at 20, as well as from post production editing at 22 to contribute to the post production editing.

While individual aspects will be described in more detail below, the exemplary illustrated comparative virtual production flow diagram 14 also begins with a development phase including generation of a story by one or both of a director and writer, shown at 26. A preparation phase includes a production designer and art (ART) department, shown at 28, with possible earlier involvement of third party vendors, shown at 30, to prepare for and facilitate production, for example via early concept work that can be fed into production or post production editing.

In the production phase of the illustrated exemplary virtual production flow diagram, an exemplary virtual asset/art department (VAD), shown at 32, provides various inputs for virtual production itself. While aspects of VAD will be described in further detail below, VAD aspects and involvement in virtual production can vary, with exemplary roles including: acting as a concept source, as informed by production, to create 3D assets; turning 2D art concepts into virtual production ready 3D assets; making existing 3D assets production worthy (e.g., from a third party vendor or otherwise); and other roles including working with other teams in a virtual production pipeline to make 3D assets ready for use in the virtual production pipeline, including preparing assets for use in principal motion capture, virtual camera sessions, previsualization, post visualization, and animation, among others. Accordingly, VAD 32, feeds into production stage work, shown at 34, and production editing, shown at 36, and draws from such editing in a cyclical way, illustrated at virtual production flow arrow 38. An exemplary production phase may also include studio review, shown at 40. Live action shooting is illustrated at 41. Post production picture editing and a final movie generated from virtual production are also illustrated at 42 and 44, respectively.

Various films that represent advancements in virtual production include, for example: Avatar; A Christmas Carol; Tintin; Mars Needs Moms; Jack the Giant Slayer; various Marvel movies; Maleficent; various Planet of the Apes movies; The Jungle Book; Ready Player One; and the forthcoming Call of the Wild, among others.

Avatar provides one good example of the usefulness of various visual effects components in a virtual production. For example, PRIOR ART FIG. 2, which is an image that illustrates several components, including a motion capture suit 46, wearable markers 48 and a headrig 50, including a facial capture camera unit 52 mounted on a boom 54. The camera unit recorded the movement of the actor's face, providing relevant facial information such that CG artists could digitally render virtual characters.

PRIOR ART FIG. 3 is an image that shows plural actors in wearable motion capture suits and headrigs, with electrical tethers 56 extending away from the actors. Certain of the actors also carry props having markers thereon, in this case in the shape of bows. A worn camera recorder 60 can also be seen in the image, as well as a worn camera synchronization unit 62.

PRIOR ART FIG. 4 is an image that shows plural characters in a virtual production stage, or "volume", with plural reference cameras 64 pointed at different actors shooting various shots, including close-ups, medium shots and wide angles of different characters in the scene to provide material for editors to take the best takes during performance editing.

PRIOR ART FIGS. 5 and 6 are images of a virtual camera that includes a stationary handle 66, a pivoting handle 68, markers 70 and a viewscreen 72. Tracked by the motion-capture system, it showed the director a real-time image of the virtual world, including actor's performances that were captured, even for pre-recorded scenes. Button controls (not shown) also allowed replication of live action set controls for the virtual camera, for example changing scales or executing aerial, dolly and crane moves.

Additionally, all recorded material could be managed in a pipeline or digital asset management system that could contain all of the artwork, track all of the performance capture takes and be the repository for all of the visual-effects work. Further reference is made, for a more complete description of the technology and techniques used for the virtual production of AVATAR, generally to "The Making of AVATAR", Jody Duncan, Lisa Fitzpatrick, © 2010 Twentieth Century Fox Corporation, ISBN 978-0-8109-9706-6, from which PRIOR ART FIGS. 2-6 were drawn.

The present disclosure describes advancements in one or more of the above-described components and systems for virtual production.

SUMMARY

The present disclosure describes systems, methods and apparatuses for generation of virtual production for films, including computer generating three dimensional environments, objects, and characters that are integrated with a motion-capture based data record of movement, dimensions and spatial relationships.

Exemplary embodiments provide for systems, methods and apparatuses for virtual production, including virtual camera, which includes a display having top, bottom, left and right sides surrounding a display screen, said display screen configured to display a virtual camera lens, a first handle connected to said left side of said display via a first joint and including a plurality of map-able control buttons thereon, a second handle connected to said right side of said display via a second joint and including a plurality of map-able control buttons thereon, wherein at least one of said first and second joint is configured to permit relative pivoting of connecting structures, and a retroreflective marker tree fixedly associated with one of said first or second pivoting arms, the retroreflective marker tree virtually representing the virtual camera that is fixedly associated with one of said first or second pivoting arms, with a center node designating said virtual camera lens and with tree extensions representing position and orientation information for said virtual camera.

Further exemplary embodiments provide for one or more of a pathing space for playback, including designated control for movement of said virtual camera along a path and configured free movement of said virtual camera around said path by physical rotation of the camera as the camera temporally moves along the path, mapping of a joystick control for playback, facilitating scrubbing to different moments of time, in a particular location looking in a particular direction as one point in a spline, and creation of splines, as well as manipulation of the virtual camera relative to the splines.

In other exemplary embodiments, a headrig, including a head shell and a boom, the boom including a camera assembly, the boom including a boom base that is reconfigurable from a first secured location on the head shell to a second secured position on the head shell to change the orientation of the camera assembly relative to the wearer. Further exemplary embodiments describe a flip of the camera assembly, with the boom base being repositioned from a first side of the head shell to an opposite second side of the head shell. Additional exemplary embodiments, described below in more detail, additionally relate to a software trigger to flip the orientation of the camera in the software after switching the head boom from one side of the head shell to the other and physically flipping the camera assembly. In additional embodiments, such software flip is facilitated by the use of square (or squared) sensors in the camera. In exemplary embodiments, a camera sensor has a nominal resolution of 2048×1536.

In further exemplary embodiments, the images can be auto-oriented (automatically flipped live during use) on the software side responsive to any mechanical orientation of the camera assembly, whether that orientation be on its side, right-side up or up-side down. In further exemplary embodiments, cameras are rotated 90 or −90 degrees, keeping the same vertical aspect ratio. Aspect ratio may correspond to face aspect ratio, and when the cameras are rotated 90 or −90 degrees, the imager's ROI may be adjusted accordingly.

In further exemplary embodiments, infrared (IR) lighting is provided on a headrig or via an active marker, with wireless phase accurate syncing of the IR lighting to camera exposure.

In further exemplary embodiments, recorders attached to headrigs are controlled wireless via a web interface and include fan controls dependent upon activity of the recorder and ambient temperatures. Further exemplary embodiments provide recorders that stream recorded files during inactive periods to servers.

Further exemplary embodiments provide innovative networking control via web interfaces with rich features.

Additional exemplary embodiments provide offset of phase accuracy and/or frame accuracy, along with wireless phase accurate synchronization.

Additional exemplary embodiments provide virtual focus devices and wheels boxes.

According to some or all of the above exemplary embodiments, the present invention thus provides systems, methods and apparatuses that provide for or facilitate virtual production for films.

The above discussed and other features and advantages of the present invention will be appreciated and understood by those skilled in the art from the following detailed description and drawings.

BRIEF DESCRIPTION OF THE DRAWINGS

Referring to the exemplary drawings wherein like elements are numbered alike in the several FIGURES.

PRIOR ART FIG. 1 provides a comparative flow chart between prior art live action filmmaking and virtual production.

PRIOR ART

PRIOR ART

PRIOR ART

PRIOR ART

PRIOR ART

DETAILED DESCRIPTION

Figure 1:
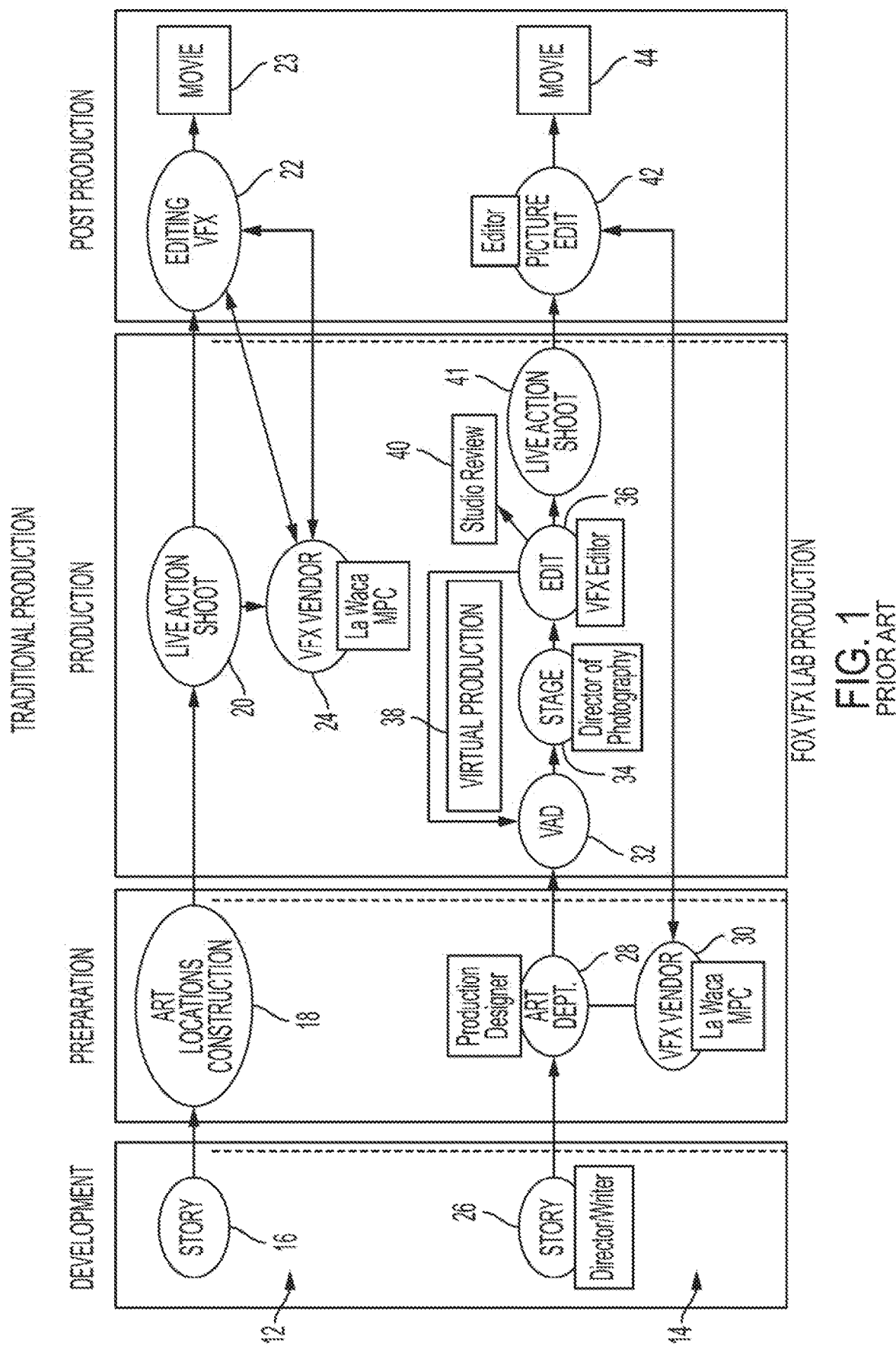
Figure 2:
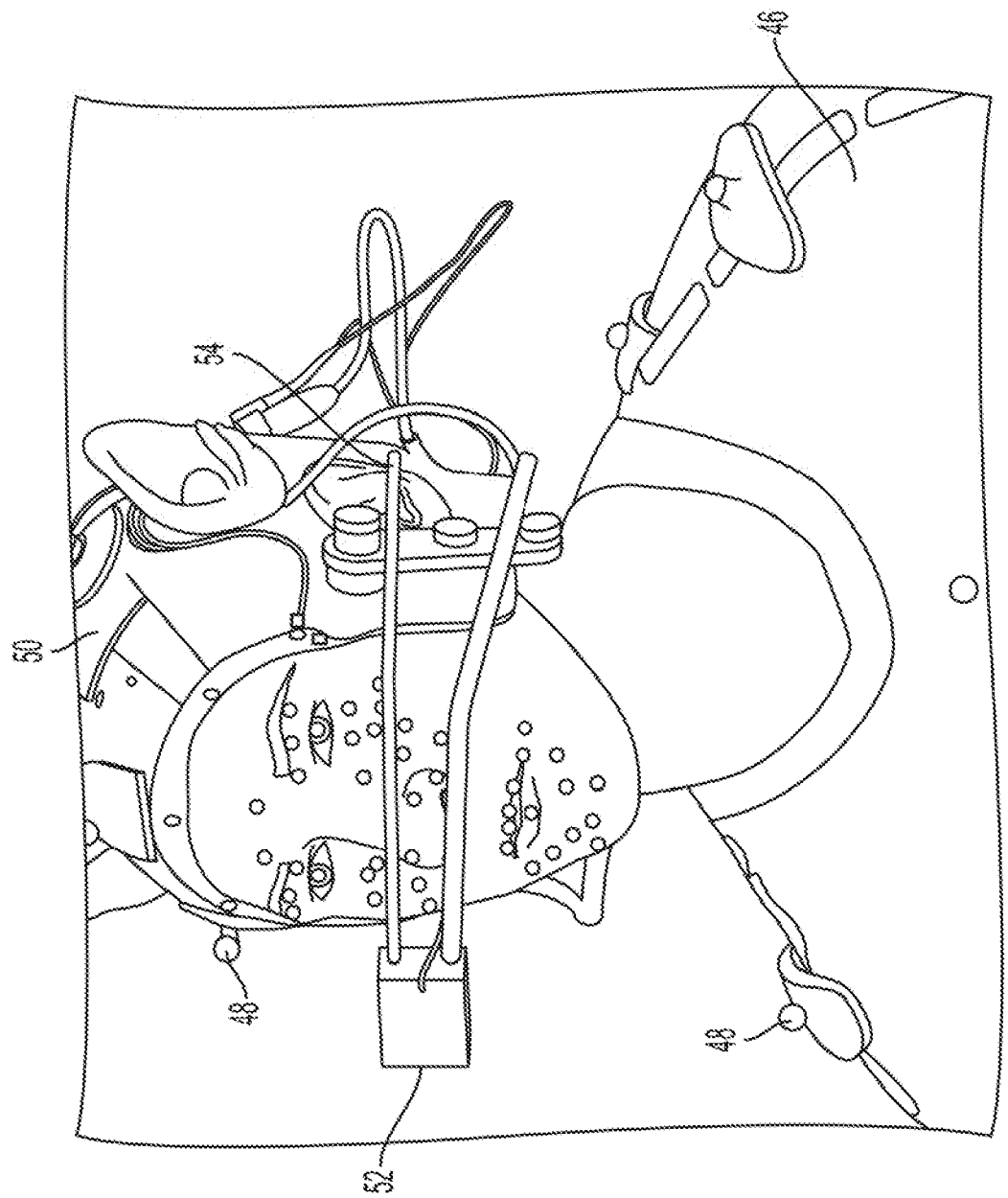
FIG. 2 illustrates a headrig and motion capture suit worn for the virtual production of AVATAR.
Figure 3:
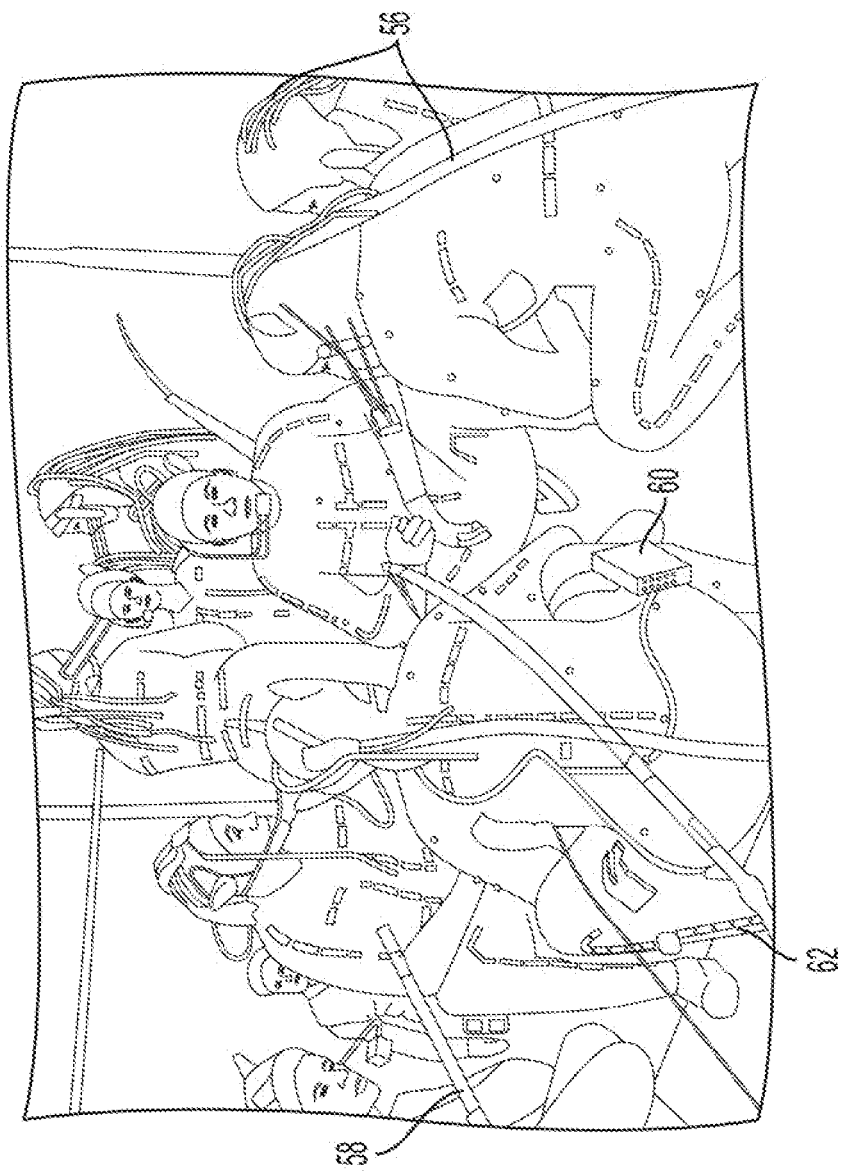
FIG. 3 illustrates plural actors wearing headrig and motion capture suits, as well as recorders, synchronization units and props, for the virtual production of AVATAR.
Figure 4:
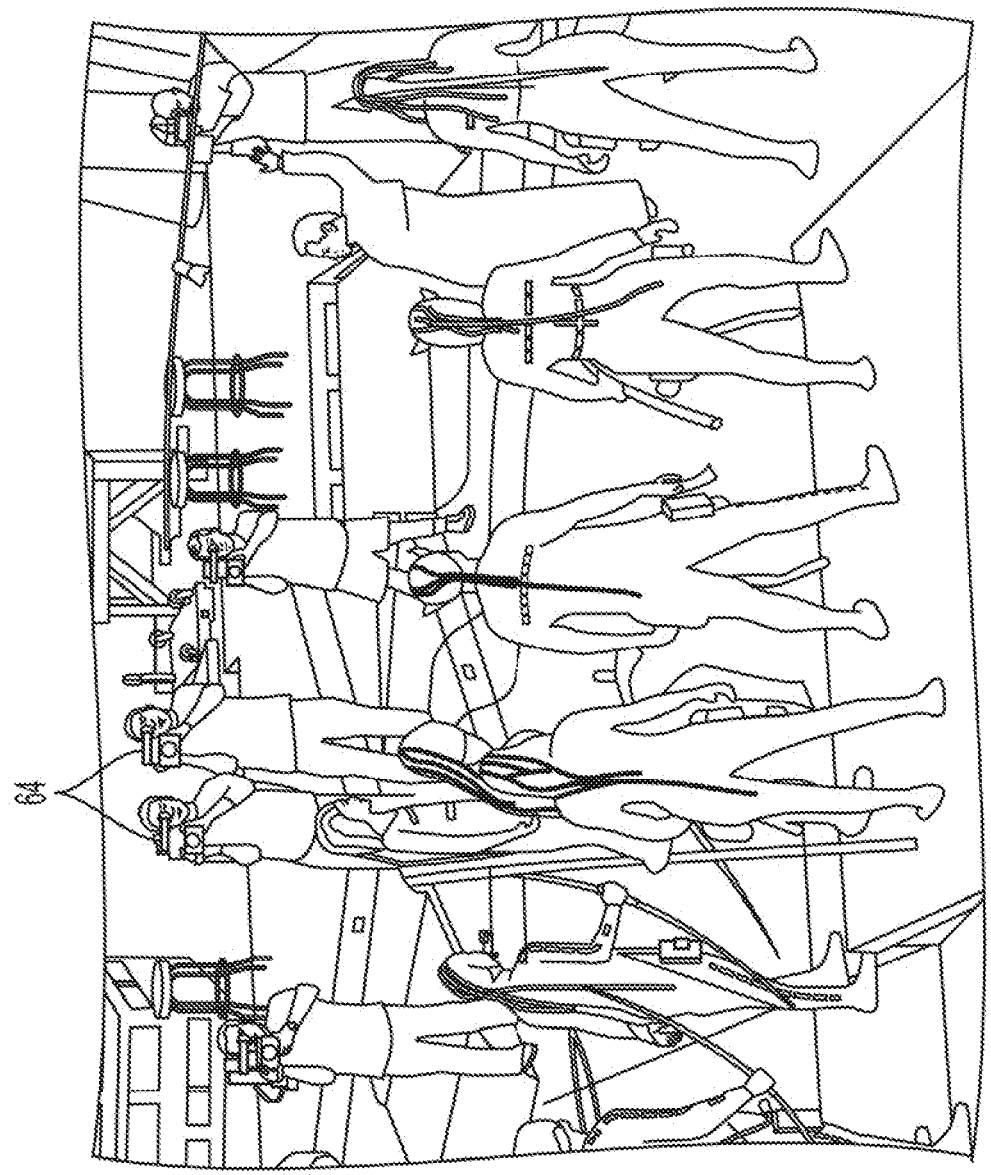
FIG. 4 illustrates plural actors and plural reference cameras in a motion capture volume for the virtual production of AVATAR.
Figure 5:
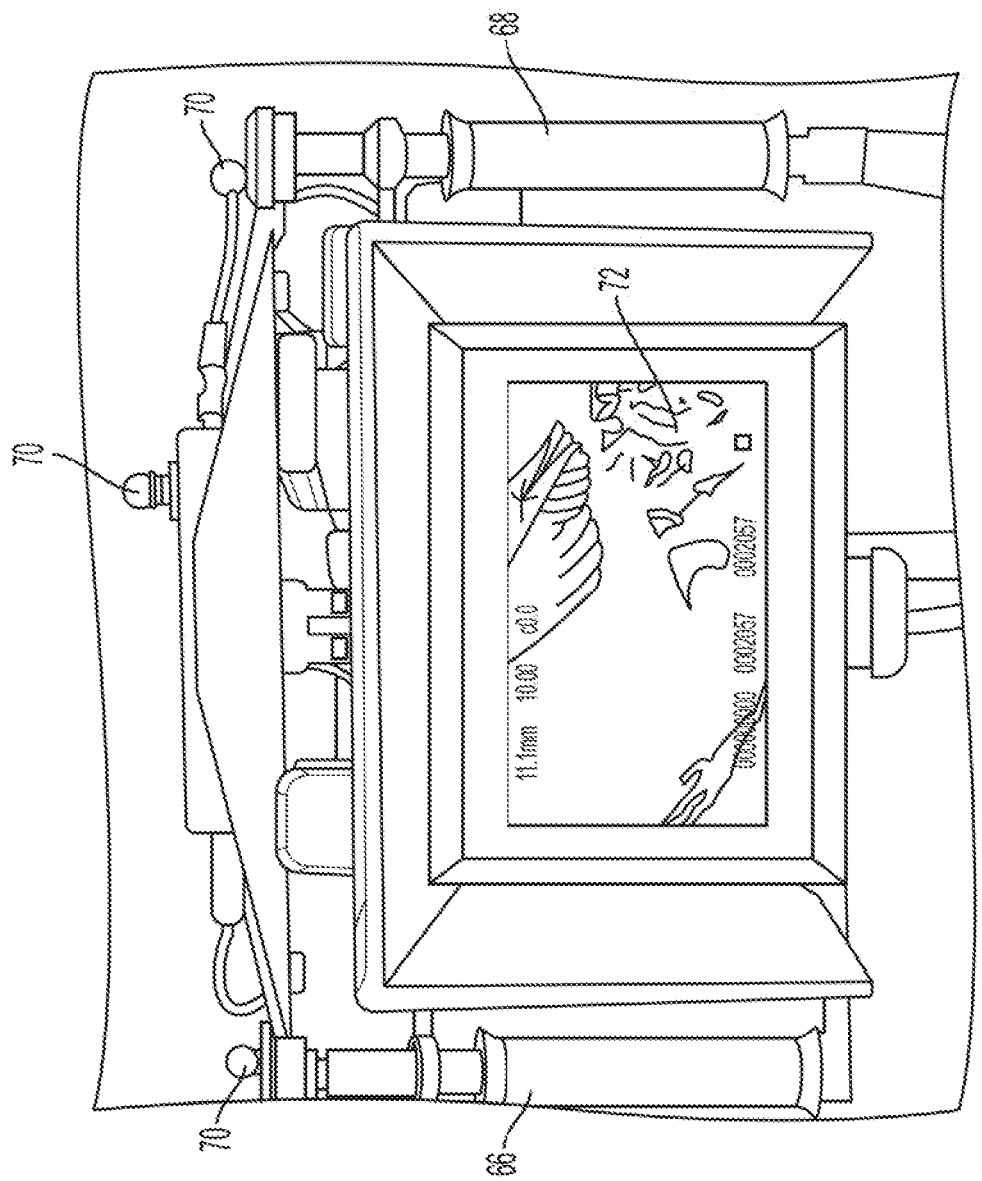
FIG. 5 illustrates a virtual camera for the virtual production of AVATAR.
Figure 6:
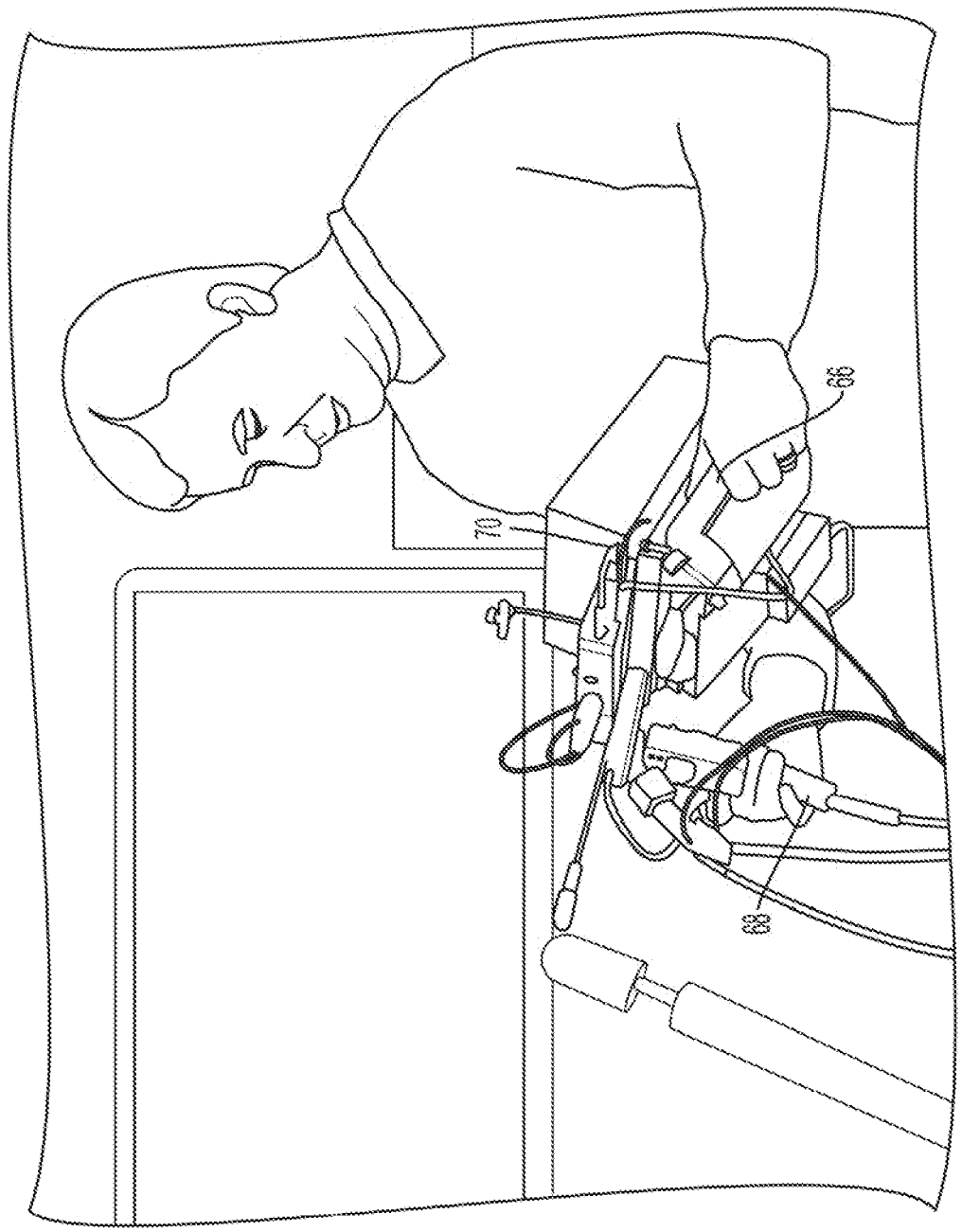
FIG. 6 illustrates use of a virtual camera during the virtual production of AVATAR.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be further understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will also be understood that the terms "photo," "photograph," "image," or any variation thereof may be interchangeable. Thus, any form of graphical image may be applicable to example embodiments.

It will also be understood that the terms "audio," "audio tracks," "music," "music tracks," or any variation thereof may be interchangeable. Thus any form of audio may be applicable to example embodiments.

It will also be understood that the terms "film," "media," "multi-media," "video," or any variation thereof may be interchangeable. Thus any form of rich media may be applicable to example embodiments.

It should also be understood that other terms used herein may be applicable based upon any associated definition as understood by one of ordinary skill in the art, although other meanings may be applicable depending upon the particular context in which terms are used.

Therefore, the terminology used herein is for the purpose of describing particular embodiments only and is not intended to be limiting of example embodiments. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Further to the brief description provided above and associated textual detail of each of the figures, the following description provides additional details of example embodiments of the present invention.

As described herein, example embodiments of the present invention may include systems, methods and apparatuses for providing virtual production for film, including computer generating three dimensional environments, objects, and characters that are integrated with a motion-capture based data record of movement, dimensions and spatial relationships.

Virtual Production

Referring to the lower, comparative virtual production section 14 of PRIOR ART FIG. 1, we have noted that the exemplary illustrated comparative virtual production flow diagram 14 begins with a development phase including generation of a story by one or both of a director and writer, shown at 26. A preparation phase includes a production designer and art (ART) department, shown at 28, with possible earlier involvement of third party vendors, shown at 30, to prepare for and facilitate production, for example via early concept work that can be fed into production or post production editing.

In the production phase of the illustrated exemplary virtual production flow diagram, an exemplary virtual asset/art department (VAD), shown at 32, provides various inputs for virtual production itself. While aspects of VAD will be described in further detail below, VAD aspects and involvement in virtual production can vary, with exemplary roles including: acting as a concept source, as informed by production, to create 3D assets; turning 2D art concepts into virtual production ready 3D assets; making existing 3D assets production worthy (e.g., from a third party vendor or otherwise); and other roles including working with other teams in a virtual production pipeline to make 3D assets ready for use in the virtual production pipeline, including preparing assets for use in principal motion capture, virtual camera sessions, previsualization, post visualization, and animation, among others. Accordingly, VAD 32, feeds into production stage work, shown at 34, and production editing, shown at 36, and draws from such editing in a cyclical way, illustrated at virtual production flow arrow 38. An exemplary production phase may also include studio review, shown at 40. Post production picture editing and a final movie generated from virtual production are also illustrated at 42 and 44, respectively.

Figure 7:
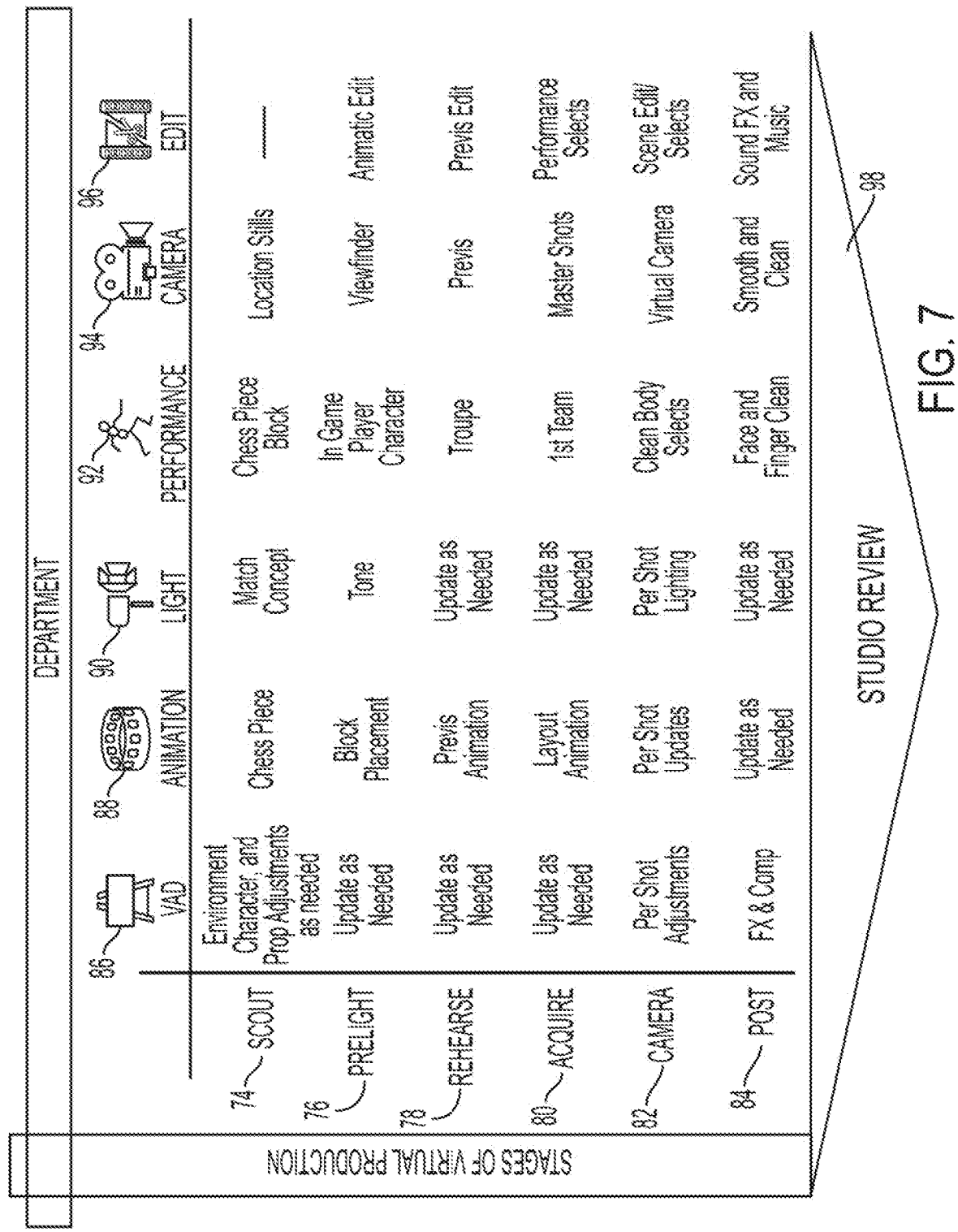
FIG. 7 illustrates an exemplary chart describing exemplary roles of various virtual production departments during different stages of virtual production.

FIG. 7 illustrates an exemplary chart of, on a y-axis, stages of virtual production, including a Scout stage 74, a Prelight stage 76, a Rehearse stage 78, an Acquire stage 80, a Camera stage 82 and a Post stage 84. The x-axis lists various virtual production departments, including VAD 86, Animation 88, Light 90, Performance Capture 92, Camera 94 and Edit 96. The bottom of the chart shows eventual progression to Studio Review 98. Various exemplary roles are illustrated for each department and virtual production stage.

For example, an exemplary VAD can take concept designs from a production designer or Art department and render them virtually, in some cases making production art playable in real time or playable in a game engine so that the asset is "legalized" or "production ready" for the virtual shoot of a production. In some cases, this may mean modification of the asset in various ways, for example scaling the asset down to a more usable size so that it can play in real time or near real time. Other exemplary modification includes modeling and texturing assets in 3D to specifications of a virtual production workflow, including conversion of 2D art to virtually pliable 3D models. This can also extend to use of art to design stories, backgrounds and entire virtual environments in a virtual space.

It also be understood that the roles of various departments, such as VAD, can vary according to the spectrum of virtual production types, some of which will be more performance capture focused, some of which are more virtual camera, or simulcam, focused, and some of which relate to full virtual production. That is, virtual production can align more with traditional techniques of filmmaking or not, depending on the target production and the blend of real time (e.g., game engine) and performance capture.

Exemplary Headrig and Headrig Components

Figure 8:
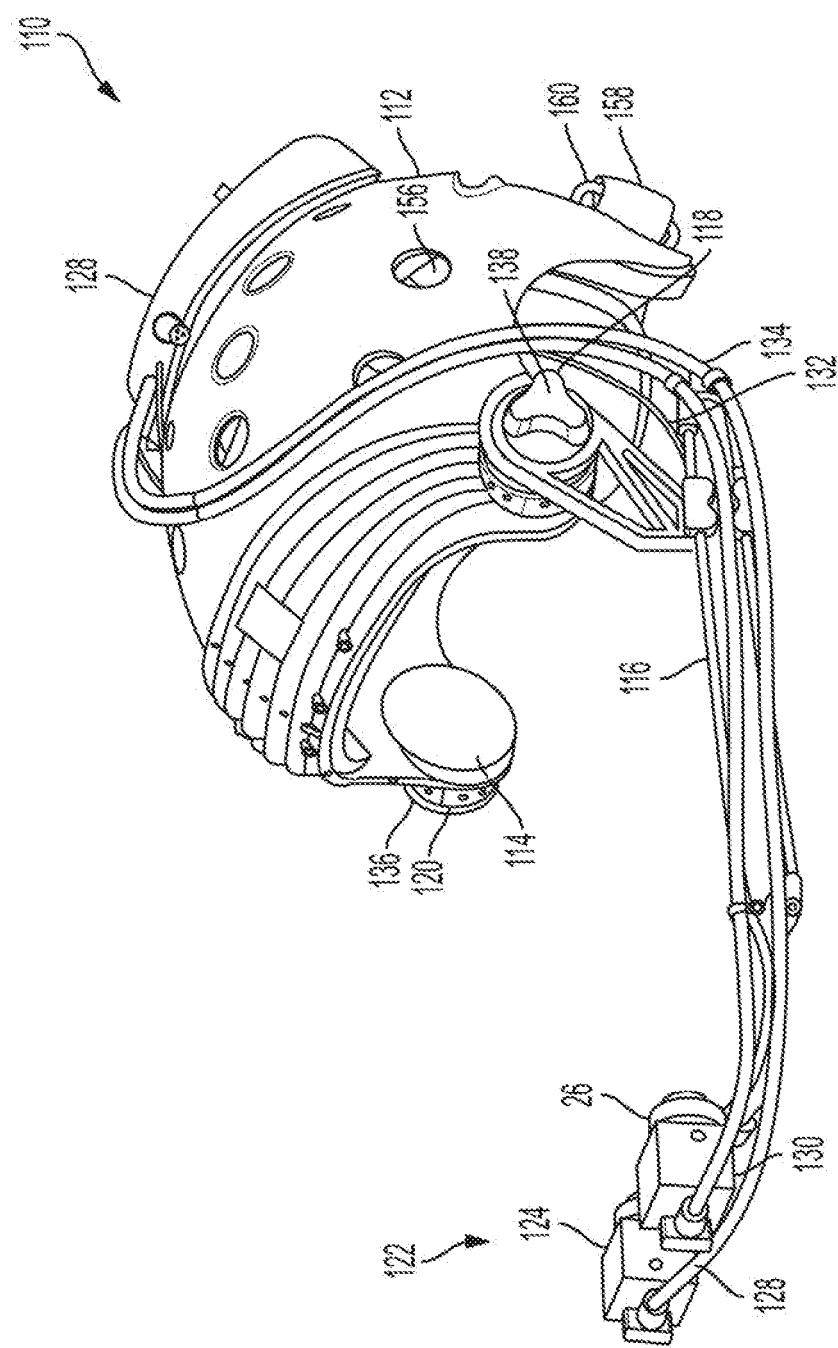
FIG. 8 illustrates a perspective view of an exemplary headrig in accordance with the present disclosure.

A first exemplary embodiment provides a configurable head rig, wearable by a person that includes at least one camera and at least one light source. FIG. 8 illustrates a perspective view of an exemplary headrig in accordance with the present disclosure, shown generally at 110. The illustrated exemplary headrig 110 includes a shell 112, removable and configurable padding 114, a boom 116 attached to the shell 112 at one of plural locations, with a first exemplary location shown at 118 and a second exemplary location shown at 120, a camera assembly, illustrated generally at 122 and including a first configurable camera 124 and a second configurable camera 126 having integrated illumination sources (e.g., emitting visual or IR light) and a camera assembly control pod 128.

As will be described in further detail below, the camera assembly control pod 128 includes one or more of wireless and physical connections or connectors to facilitate control of cameras and/or illumination sources and to transmit camera footage to a recorder or other system. The illustrated embodiment in FIG. 8 also shows four exemplary cables connecting the control pod 128 and the camera assembly 122, including a first camera cable 128, a second camera cable 130 and first and second illuminator cables 132, 134.

In the illustrated exemplary embodiment, first and second exemplary boom attachment locations 118, 120 include threaded knobs 136, 138, which attach to the boom to provide variation of the position of the boom, and thus variation of the position of the camera assembly and any associated lights (including lights integrated with the camera assembly or other lights, such as alternate or additional gooseneck or other illumination sources attached to the boom) with respect to a wearer's head. The illustrated exemplary embodiment in FIG. 8 illustrates two separate stationary primary points of attachment (118, 120) for the boom to the headrig shell; however additional constructions are contemplated herein, for example, use of a curved sliding rail between those positions to allow the boom to slide and secure to those positions or any desired location in-between those positions.

Thus, exemplary embodiments describe a headrig, including a head shell and a boom, the boom including a camera assembly, the boom including a boom base that is reconfigurable from a first secured location on the head shell to a second secured position on the head shell to change the orientation of the camera assembly relative to the wearer. Further exemplary embodiments describe a flip of the camera assembly, with the boom base being repositioned from a first side of the head shell to an opposite second side of the head shell. Additional exemplary embodiments, described below in more detail, additionally relate to a software trigger to flip the orientation of the camera in the software after switching the head boom from one side of the head shell to the other and physically flipping the camera assembly. In additional embodiments, such software flip is facilitated by the use of square sensors in the camera. In further exemplary embodiments, the images can be auto-oriented (automatically flipped live during use) on the software side responsive to any mechanical orientation of the camera assembly, whether that orientation be on its side, right-side up or up-side down.

Figure 9:
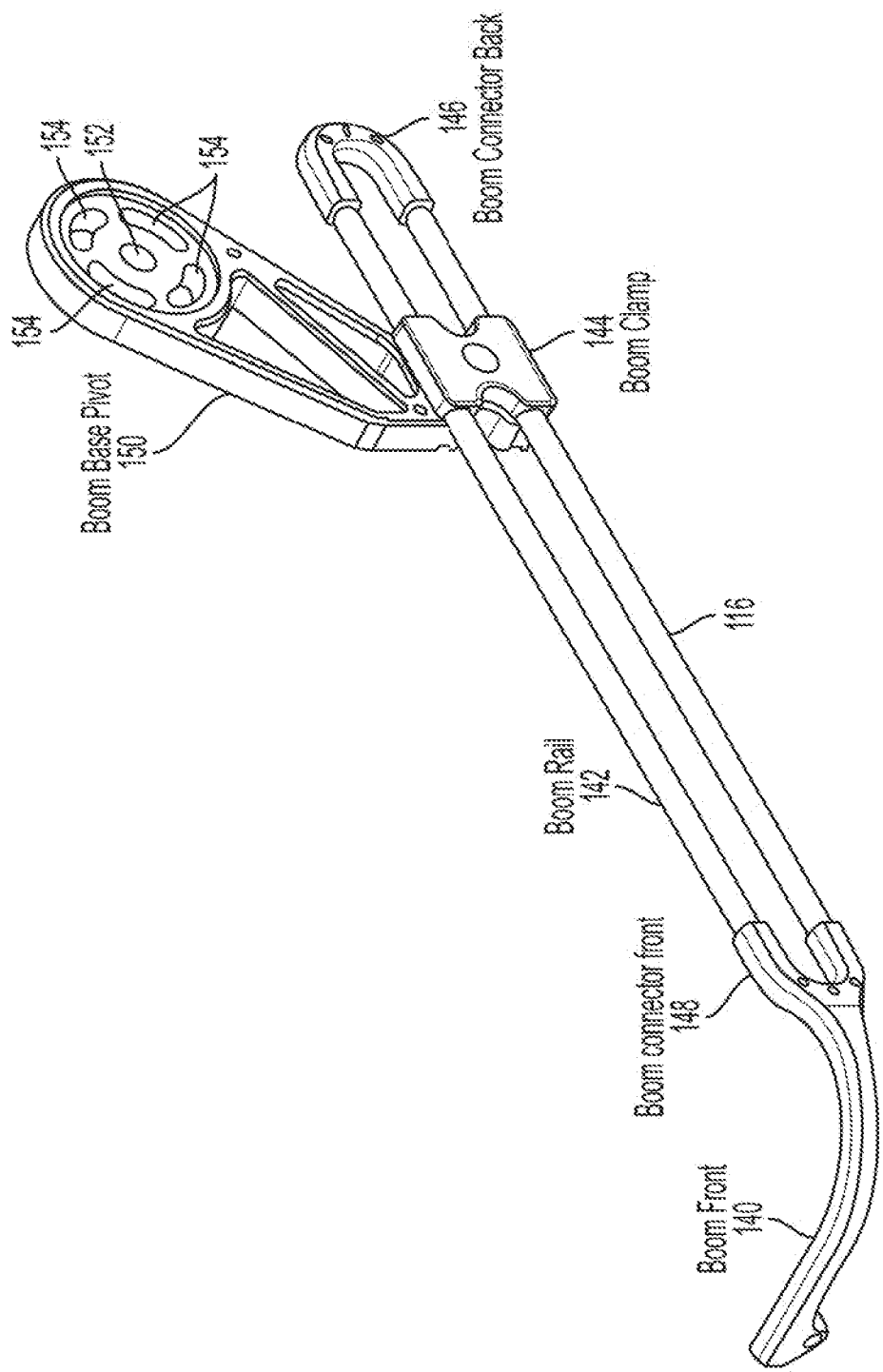
FIG. 9 illustrates a perspective view of an exemplary boom of the headrig of FIG. 1, in accordance with the present disclosure.

FIG. 9 further illustrates the exemplary boom 116 of FIG. 8, including a boom front 140, to which the camera assembly 122 attaches, a boom rail 142, which provides a protruding length (relative to the shell 120) adjustment by virtue of adjustable boom clamp 144, boom connector back 146, which in exemplary embodiments provides for out of the way connection of exemplary cables 128, 130, 132, 134 (note that such cables may also attach at any other convenient position such as boom connector front 148), and boom base pivot 150, which in the illustrated exemplary embodiment, includes a central connector aperture 152 configured to accept the illustrated exemplary threaded knobs 136, 138. The threaded knobs secure the boom base pivot 150 in various pivot orientations by application of friction and/or assisted interference of pin in apertures at plural positions (see for example exemplary apertures 154 in FIG. 9).

In additional exemplary embodiments, headrig wearer comfort is further facilitated by one or more comfort features, such as one or more ventilation holes 156 in the shell 112 illustrated in FIG. 8. Further, the shells themselves, as part of a modular system, may be rapid prototyped or molded to preset sizes (e.g., small, medium, large, extra-large) or to custom sizes for particular actors (based on a digital scan of an actor). Though not shown in FIG. 8, any portion on or within the headrig may also be provided with tracking markers (alike for each size of helmet) to facilitate establishing a position in space for tracking purposes.

To facilitate rapid assembly on set, the boom and camera assembly may quickly be removed, along with the control pod 128 and associated wiring, with the former for example being attached to the shell via a quick release mechanism, latch and hook material such as Velcro™, etc. Further, a chin strap 158 and strap attachment points 160 may be conveniently located out of the way, for example at the back of the head with similar quick release material for providing both adjustability, quick release and out of the way placement when not in use.

Figure 10:
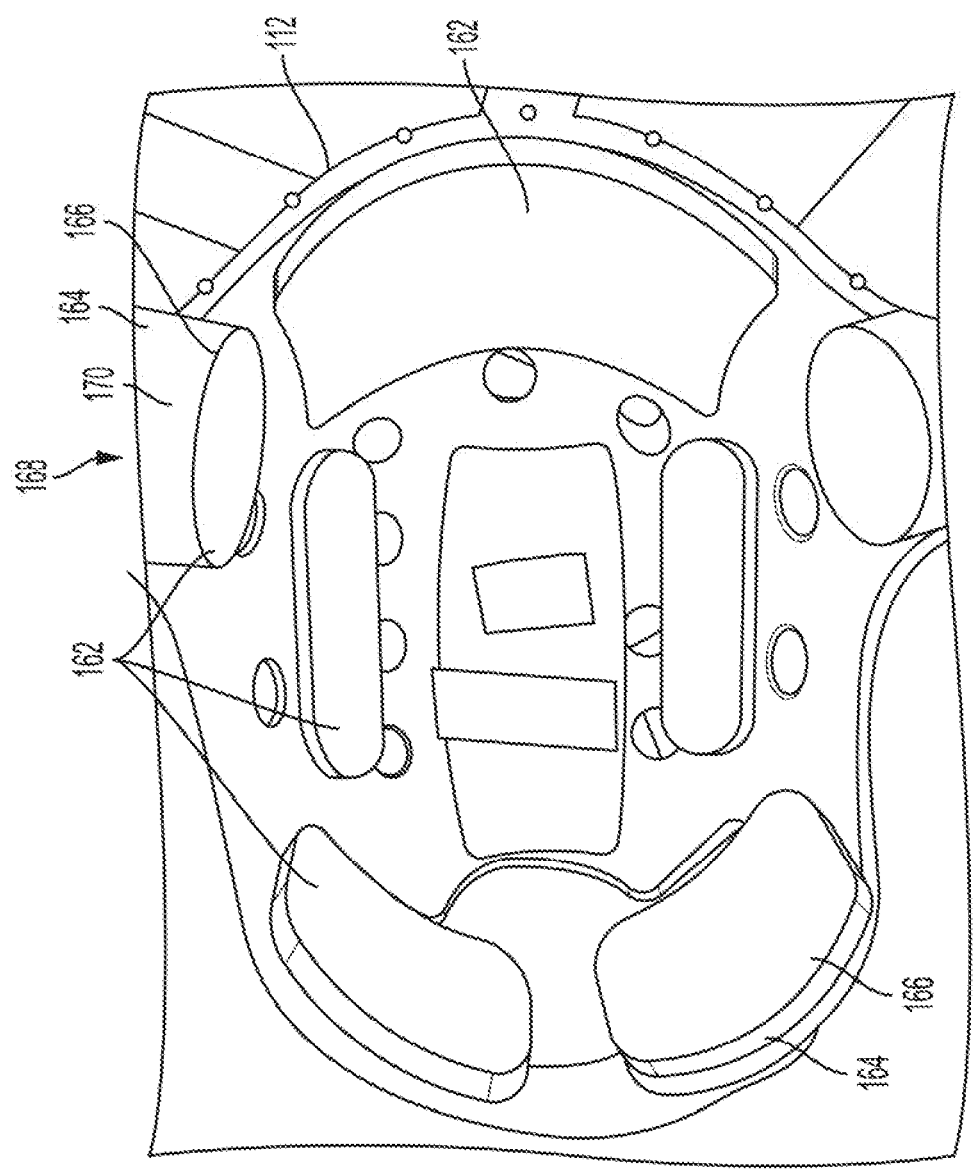
FIG. 10 illustrates a bottom elevation view of an exemplary headrig shell including customized pads, in accordance with the present disclosure.

Also in exemplary embodiments, interior shell padding may be provided as custom sizes and/or with different foam densities. FIG. 10 illustrates a bottom elevation view of an exemplary headrig shell portion 112 including plural exemplary foam pads 162. In the illustrated exemplary embodiment, most pads 162 include a first lower layer towards the shell (see, for example pad layer 164) and an outer layer 166, having a different foam density configured to rest against the head. However, multiple configurations are contemplated beyond two layers, as for example a temple pad, shown generally at 168 includes a first layer 164, an outer layer 166, as well as an intermediate layer 170.

In one exemplary embodiment, the pads include plural pad layers with different foam densities, the pads heat bonded together, without using glues or hypoallergenic materials. Such a construction allows custom thicknesses of pads to be made, but also provides a machine washable, hypoallergenic product that can be easily swapped into a helmet shell and that is comfortable for the actor. One exemplary suitable outer layer includes Sportek™ material. Exemplary intermediate layers might be, for example a Rubberlite™ polyether or a CMI™ ZF-Flech material. One exemplary suitable inner layer (towards the shell) includes a CMI™ headliner face fabric.

Headrig—IR Lighting and Synchronization with Camera Exposure

Other exemplary aspects of the present disclosure provide control of IR lighting for the headrig, and synchronization with camera exposure. As was noted above with reference to FIG. 8, described exemplary aspects of the headrig include one or more illumination sources, either integrated or provided on the camera assembly, or otherwise associated with the headrig and the actor's face.

One exemplary embodiment relates to use of IR light as a mechanism for lighting an actor's face without providing discomfort to the actor. Further, IR lights can be synchronized with camera exposure such that the IR lights need not constantly illuminate the face. For example, in exemplary embodiments, one or more IR lights can be strobed in synchronization with the exposure of the cameras such that the IR lights are only on when the camera is actually looking at the face. The spectrum of IR light can selected such that it is visible to the cameras (i.e., no camera filter for the emitted frequency/frequencies of IR light, even if other frequencies of light are filtered) and such that it is at least mostly invisible to humans (i.e., predominantly out of the human-visible spectrum of light). With regard to filtering, in further exemplary embodiments, a notch filter is provided for the camera that only lets in light of the same wavelength of the lights used in the illuminating source (e.g., a light emitting diode (LED)), eliminating excess ambient light and possible negative effects from head movement that can affect tracking abilities. Further, in exemplary embodiments, the frequency of the emitted light is multiplied to ameliorate possible strobing effect.

Exemplary embodiments in accordance with the above provide a number of benefits, including the ability to shoot in darkness without discomfort to the actor from visible light, as well as a reduction in the need for power from the illuminating source. For example, power coming off of an exemplary LED can be reduced by providing only short bursts at minimal RMS (average) power (utilizing a higher power LED in bursts rather than simply utilizing a lower power LED). Because exemplary embodiments sync these bursts with camera exposure, to the camera(s), the light appears to be bright, though the headrig wearer is only subjected to a small amount of average powered light. Additionally, such exemplary embodiments permit the use of small shutter speeds, mitigating possible motion blur, at multiple frame rates (for example at 60 frames per second (fps), though other frame rates may be utilized).

In exemplary embodiments, synchronization ("sync") occurs as a wireless phase accurate synchronization, which is not simply transmission of time code, but is rather locking the phase of the acquisition precisely, for example on the order of microseconds or tens of microseconds. Thus, exemplary embodiments ensure that one or more cameras or camera assemblies (inclusive for example of plural different headrigs) expose at the same time as the motion capture such that it is in sync with either a main picture camera and/or the phase of a motion capture system and any reference cameras being utilized.

Figure 11:
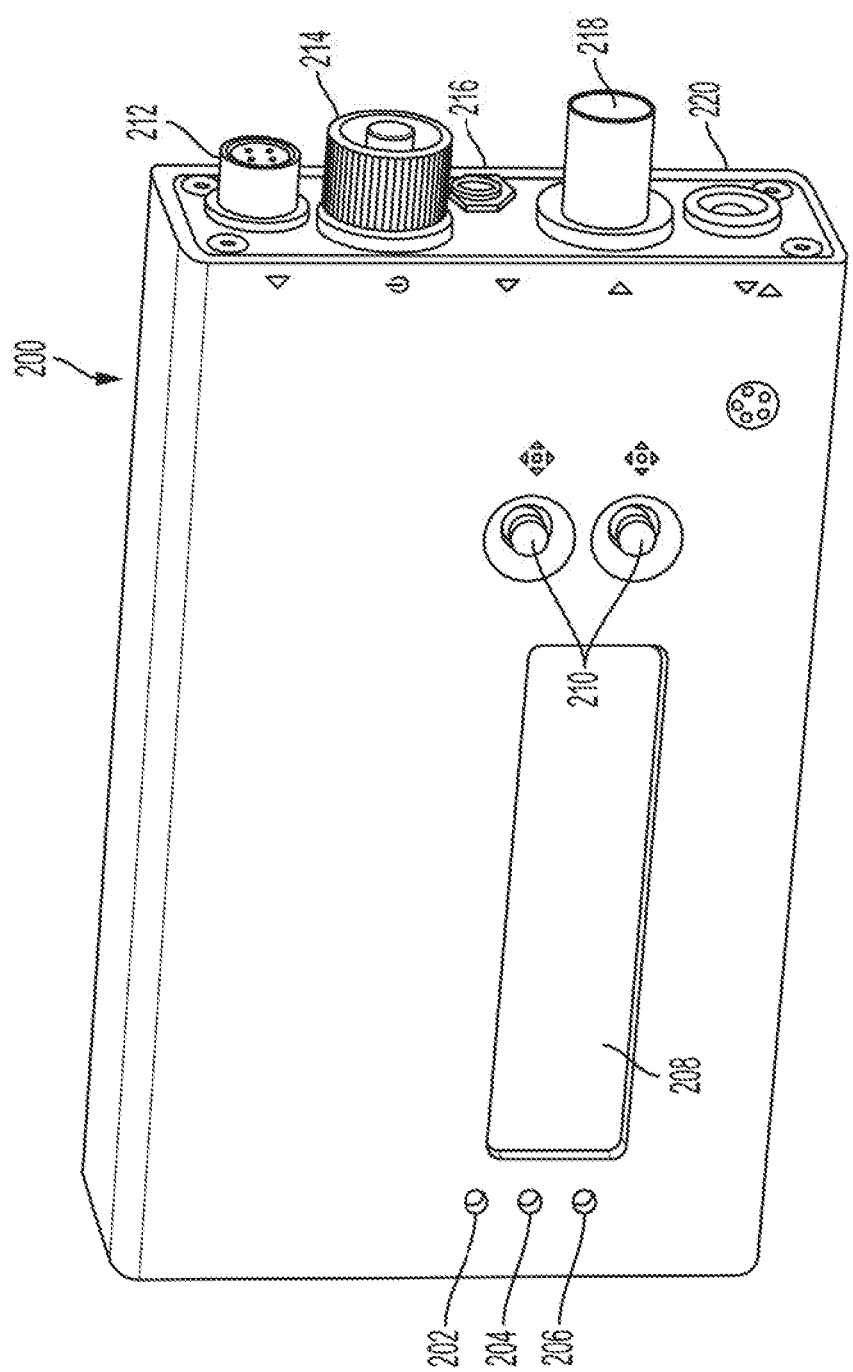
FIG. 11 illustrates a perspective view of an exemplary wireless phase accurate sync device, in accordance with the present disclosure.

Reference is made to FIG. 11, which illustrates a perspective view of an exemplary synchronome, shown generally at 200, for wireless phase accurate synchronization. The synchronome provides a phase-accurate timing device that broadcasts vertical sync and timecode. In the illustrated exemplary embodiment, an exemplary interface includes a power LED 202, a time code ("TC") LED 204, a sync LED 206 (in the illustrated exemplary embodiment, a solid LED for the sync LED 206 indicates a locked sync), a display 208, menu navigation buttons 210, a 12-18 volt DC input 212, a power switch 214, a time code (SMPTE)/sync input 216, a sync output 218 and a separate time code (SPMTE) input and output connector 220, with additional unused leads. In exemplary embodiments, the synchronome 200 includes internal wireless and networking capability, though alternate embodiments contemplate a breakout wireless component, with a suitable breakout cable and connector.

Thus, exemplary embodiments utilizing such synchronome for wireless phase accurate syncing, ensures temporal accuracy so that all relevant equipment fires at the exactly the same time; and with reference to headrig camera assemblies, ensures that such assemblies sync in phase with any existing motion capture system and reference, such that an editor accessing various particular frames knows that it is the same for every device being used, i.e., that the exposure of the facial cameras went off at the same time as the motion capture camera, the reference cameras and taping cameras around a live action set. Exemplary embodiments described herein provide a wireless solution for such wireless sync actions.

With regard to use of cameras that do not themselves generate time code (for example USB3 cameras), in further exemplary embodiments, a component of the wireless sync system, e.g., the control pod 128 or the synchronome 200 identifies a digital signal input from the camera that is captured once per frame and ensures that the digital signal input has a value that is different when there is a zero crossing of frames in the timecode than in the rest of the frames. Thus, when a software/computing module in the system receives the data, it gets a frame with a value (e.g., "1") and receives time code, knowing that it was a zero cross (having a sign of "+1" or "−1" second). As long as the latencies are not more than one second, the software can be sure what exactly the time code is for any given frame. Therefore, as long as the system is all in even or odd frames, the zero/zero on the time code is the same, which ensures that everything lines up on at least the zero/zero frame. The software/computing module can then carry on from that point, using the local timestamp of the frames to know where in the sequence (within the next second), those frames lie.

Recorders

Figure 12:
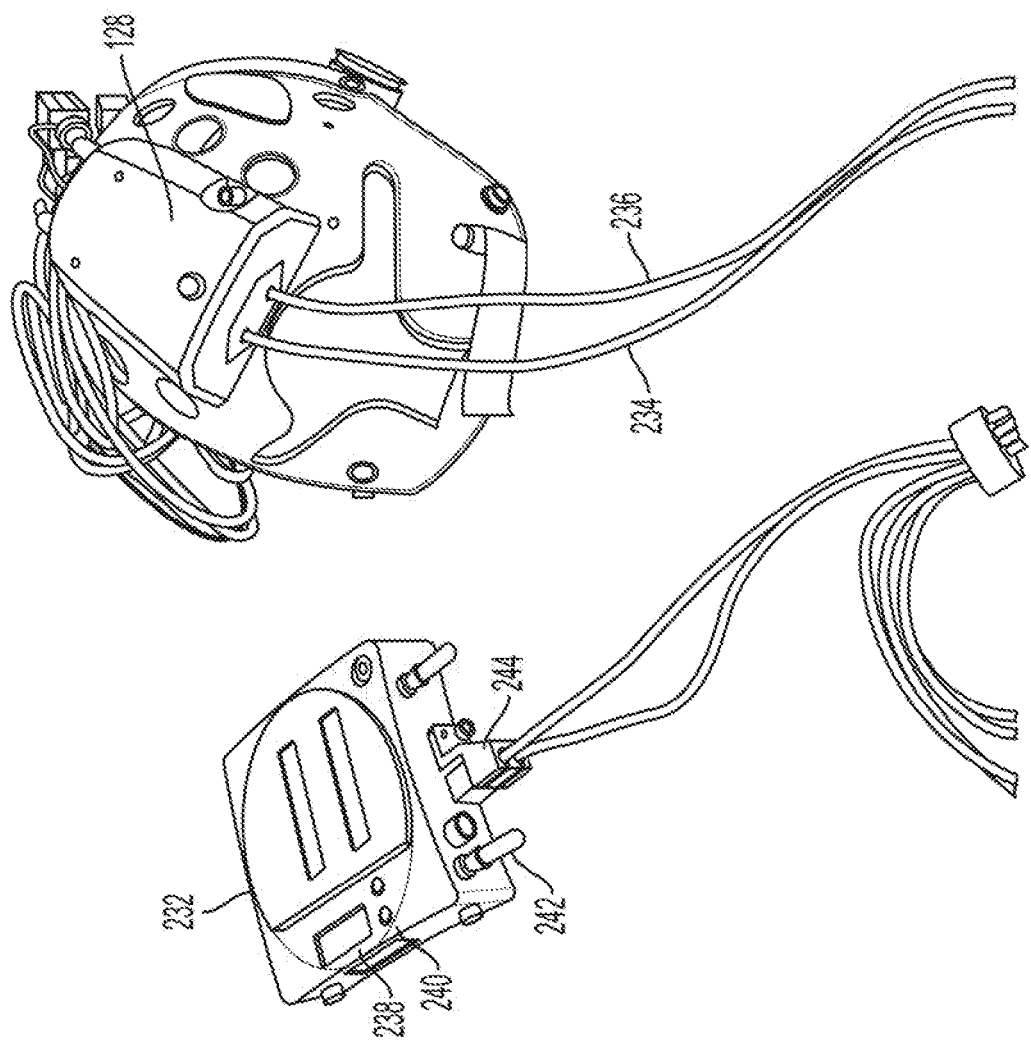
FIG. 12 illustrates a perspective view of an exemplary connection between a recorder and a headrig.

Referring now to FIG. 12, exemplary embodiments also provide for wearable recorders 232 tethered to the camera control pod 128, via at least one connection (plural connectors 234 and 236 are shown in FIG. 12). In one exemplary embodiments, a USB-C connection is provided between the recorder and the camera control pod. In exemplary embodiments, the recorder includes a heat sink in a housing, along with a fan that is controlled in a specific way. Such recorders may be worn by an actor in any convenient position utilizing various modular mounting pouches and straps, for example on the back, front, legs, etc., rather than simply being belt mounted.

Referring still to FIG. 12, in further exemplary embodiments, the recorder includes a screen 238, controls 240, one or more wireless antennae 242 and a releasable connector cable protector 244 to prevent one or more cameras from pulling free during a live action shoot.

In further exemplary embodiments, the recorder includes an LCD display configured to display information such as time code, a network interface code ("NIC"), etc. In additional exemplary embodiments, such recorder includes storage configured to automatically record, for example in the event a network connection is lost.

Exemplary fan controls may be configured to minimize revolutions per minute (rpm) during recording dependent upon various temperature thresholds, e.g., running at full speed if the device temperature is higher than 70 degrees centigrade (C) when not recording and reducing fan speed to a minimal or zero speed dependent upon automatic detection of ambient temperature.

In exemplary embodiments, network control of recorders allows for manual or automatic remote triggering of one or more recorders associated with a headrig. Further, the system may be configured with certain automated functions activated by a trigger event, such as initiation of recording on one or more headrig recorders. One such exemplary automated function is activation of one or more lights on a headrig upon initiation of a record function.

In additional exemplary embodiments, recorders perform an integrity check on recorded files after a record stop function, wherein the integrity check is performed on the files generated, with a report via the web interface on the status of the last recording to indicate if there was an error, such as disconnection or loosening of a cable during a stunt. Additional interactive warnings may be generated by the system to check such file.

Additional exemplary embodiments provide a visual light on top of the helmet or on the control pod 28 to indicate that it is recording, which can also be useful during loss of wifi or in the absence of feedback from the software, as an easy and evident way of ensuring from afar that all relevant actors are recording (before an integrity check), providing time for manual actuation of recording or a check of physical connectors.

Further exemplary embodiments, include a secured USB connector, utilizing a bracket that is mechanically secured (e.g., via a screw or other fastener) on the connectors to prevent accidental pulling of the cable on the recorder or headrig. Additionally, exemplary embodiments include a recorder having a recessed manual record button, requiring pressing past a cavity to record, thus preventing accidental activation by the actor.

Networked System and Control Software

We have indicated above that plural headrigs having recorders and plural cameras and lighting may be used at the same time. We have also indicated that the system provides wireless phase accurate syncing with regard to all of those devices using a wireless synchronome.

Figure 13:
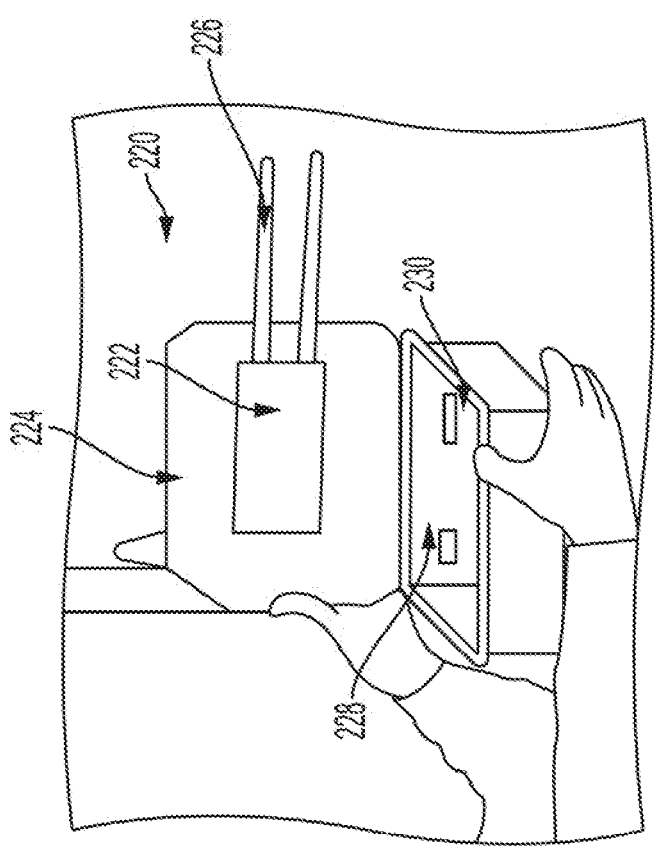
FIG. 13 illustrates a front elevation view of an exemplary rugged, portable wireless access point, in accordance with the present disclosure.

While components may connect to any suitable network, an exemplary embodiment provides a robust wifi router in a custom box, as shown generally at 220 in FIG. 13. Wifi router 222 is mounted within the lid of robust box 224 with protruding antennae 226. Additional elements include a battery or battery pack 228 and a heat sink 230, providing durable networking that is movable with the equipment.

In further exemplary embodiments, plural headrigs, recorders and the synchronome have wireless networking capabilities, such that they are discoverable on a network. In additional embodiments, such devices are self-seeking and can find each other on said network. In further embodiments, a network address of at least one component (e.g., one headrig) may provide access via a web interface on a generic wireless device (such as a mobile phone) for control system wide. In such an exemplary embodiment, for example, thirty headrigs might be on a live action set connected to the network, with the need to only go through the web interface of one headrig to control all of them. Additionally, in exemplary embodiments, such web interface controls lighting, views selected camera feed(s), initiates record functions, etc.

Figure 14:
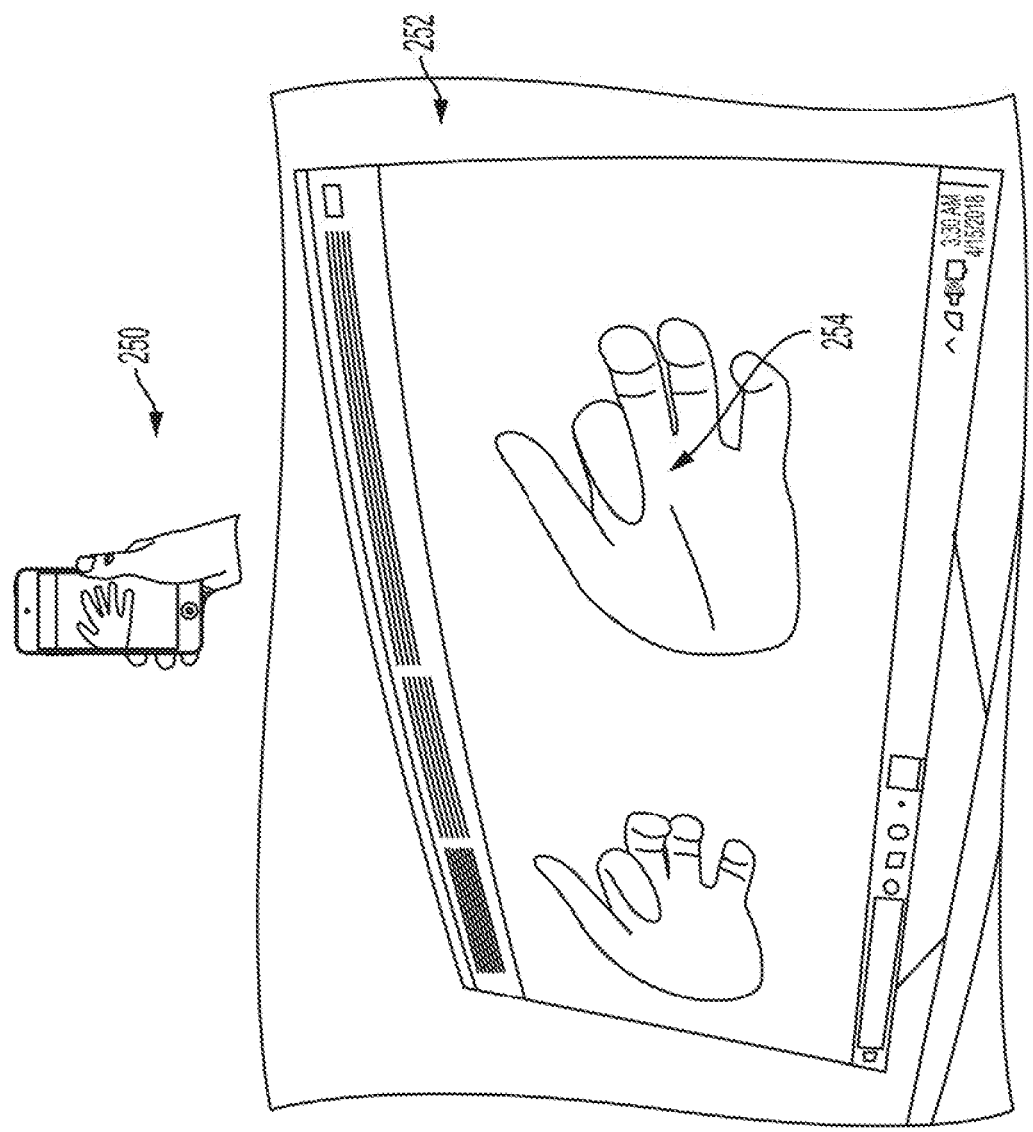
FIG. 14 illustrates perspective views of an exemplary mobile web interface and shared display, in accordance with the present disclosure.

In an exemplary control system, the wireless phase accurate sync device wirelessly connects and syncs to plural head rig pods. A web interface as has been described by way of example above is illustrated generally at 250 in FIG. 14, side by side with optional screen sharing on a larger display (not showing the same screen moment), shown generally at 252. Via the web interface, selection of any camera channel provides the timecode and frequency, which frequency can be changed via the wireless phase accurate sync device, e.g., from 24 fps to 48 fps.

In exemplary embodiments, the web interface also allows activation and deactivation of any desired one or plural entities on the space, for example if there are 30 headrigs in the space, the web interface user can deselect as many particular devices as desired, e.g., 20, so that the remaining 10 are the only ones seen or recorded by the system. In further exemplary embodiments, the web interface provides one or more controls selected from the following: exposure controls; individual camera control, including above-mentioned boom (left/right) button to flip the images 180 degrees; independent control of front and possible head mounted side lights (e.g., via a gooseneck mount attached to the control pod); exposure control between cameras; gain control between cameras; light intensity, etc.

Further exemplary embodiments provide alternate mechanisms for acquiring recorded files, for example remotely or via a USB drive. In an exemplary embodiment, to avoid and of day download of data (which can amount to hours of download per recorder), files are downloaded wirelessly when a given recorder is not recording, effectively trickling files off to a server during recorder downtime.

Additional exemplary web interface control may be configured to lower or set fan control to minimize audible noise (although that function could also be pre-programmed in the recorder itself). Further, exemplary web interface control may be configured to use white lights when not using IR and to set light preferences for an actor, such as intensity ramping for comfort when lights come on or shut down versus always on versus on only during recording, with further exemplary embodiments providing actor custom profiles for preferences.

With regard to viewing web interface data on a mobile device, computer or larger display, an exemplary embodiment provides a real time vs. delayed streaming toggle (delayed streaming allowing reduced data transmission), with e.g. real time being on the order of at least 60 fps. Further exemplary embodiments permit customization of the display view, permitting e.g., toggling between full frame, single camera, dual cameras, or any other convenient view (e.g., hiding unnecessary functions on the web interface during solving off of one or two cameras).

Further exemplary web interface features include cross hairs for alignment (see item 254 in FIG. 14) or size comparison.

Active Markers

Figure 15:
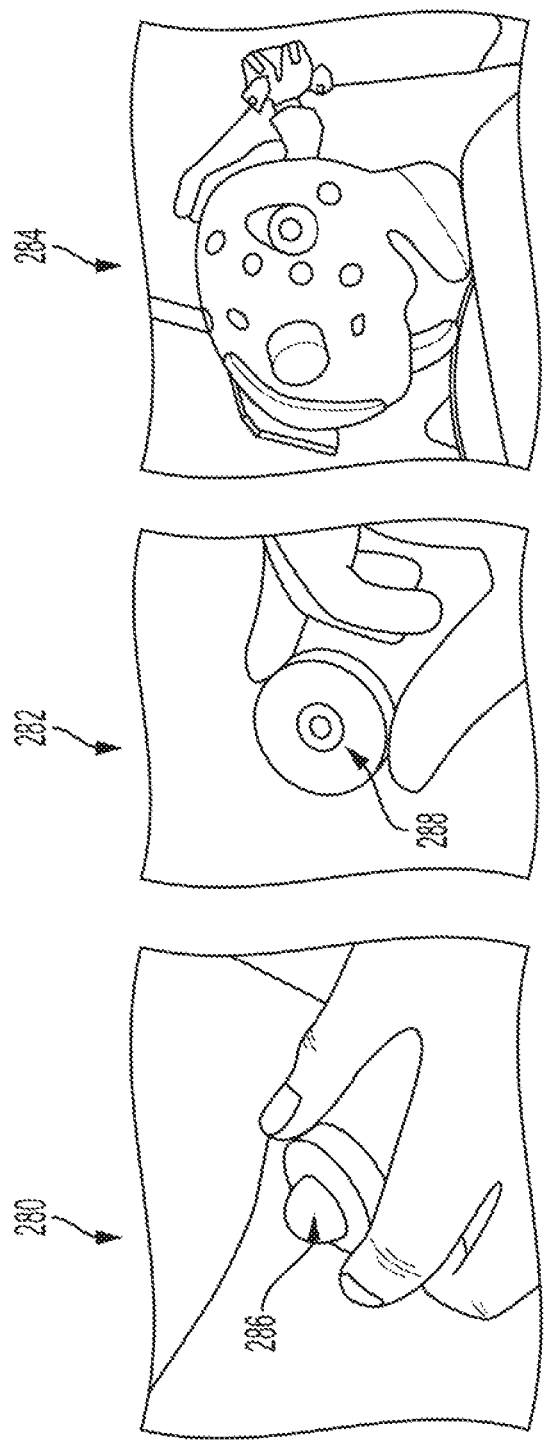
FIG. 15 illustrates perspective views of an exemplary active marker device, in accordance with the present disclosure.

Additionally, exemplary embodiments described herein include active markers facilitating tracking of objects by the system. FIG. 15 illustrates a perspective view of the top of an exemplary active marker generally at 280, the bottom of the active marker at 282 and a mounting of the active marker on a headrig at 284 (e.g., via Velcro™). The illustrated exemplary active marker in FIG. 15 provides a dome shaped light 286 from an internal LED.

In exemplary embodiments, the active markers include wireless capability such that they can be recognized (e.g., via a network ID) and controlled on the above-described network by a web interface, including wireless phase accurate syncing, in the same fashion as been described above with regard to illumination sources on the headrigs. Wireless capability coupled with the ability to reduce power requirements via the wireless phase accurate syncing with the cameras allows the markers themselves to be wireless, rechargeable and usable (in the sense that active markers can last a meaningful time, such as a day, on a single charge utilizing the wireless phase accurate syncing. In exemplary embodiments, the active markers may be remotely turned off completely, as well as providing LED on/off remote functionality.

Previous markers either had to be portable, passive markers (retroreflective and having limited usage in certain lighting conditions, such as outdoors, around shiny objects or clothes, etc.) or wired markers.

The presently described exemplary active markers solve the problem of doing motion capture in less controlled lighting conditions (normal lighting conditions for live action, motion capture outdoors, etc.). Further use of exemplary notch filters (as described above), with the described syncing protocols and thermal management derived therefrom facilitate such less controlled lighting use. Additionally, pulsing the LEDs, as with the headrig LEDs, allows usage of the LED that exceeds specifications for a few microseconds, bright for that short amount of time and very discernable with respect to most reflections.

In exemplary embodiments, upon activation, the flashing pattern and number identify whether the marker is charged and/or how much it is charged and what channel it is on. As with other devices on the network, the active markers can be turned off and on remotely. Further, exemplary web interface controls may be configured to use different channels to turn on and off multiples, e.g., by having actors with different setups on different channels, by having props on one channel and actors on another, etc. Further exemplary web controls permit changing the light exposure (i.e., the amount of time the light is actually on), e.g., setting it to the minimum amount required, turning it off between shots to extend life, etc. Further, as with other wireless phase accurate syncing, an exemplary delay function, such as 10ths of milliseconds, may be introduced (purposefully pushing timing around to match the third party or external sources) to ensure compatibility with different existing motion tracking systems (or other external sources). Though multiple sensors may have the same masterclock, the above describes exemplary use of purposeful latencies or delays as tools to help them align properly (offsetting phase in time).

Additional uses for the exemplary delay function include adjustment of phase accuracy for IR LEDs that can negatively affect other cameras around the volume, showing up as markers (with the solution being to offset by, e.g., 2 milliseconds so that right when the camera shutter closes, the LEDs turn on. This exemplary embodiment provides for selective un-synchronization, allowing select illumination devices to become invisible to those devices an operator does not want to see the un-synchronized sources.

With regard to possible interference for wireless active markers, an exemplary embodiment transmits the active marker signal at a relatively low level such that there is no stack on top of it, avoiding interfering activity from, for example mobile phones.

In exemplary embodiments, signals are also verified as valid by a follow-up signal of data. Time of receipt of the first signal may be captured, with at some time later (such as a microsecond or millisecond), the follow-up signal may be received confirming that it was correct. The signals may then be used to correct the internal clock so that it keeps ticking. In exemplary embodiments, in the event that a follow-up signal is not received, the active marker keeps running, turning on the LEDs, with corrections only when confirmed wireless phase accurate sync signals are received.

In further exemplary embodiments, a lower charge button 188, having concentric rings for contracts, is provided on the active marker, which has a round configuration allowing the marker to be dropped, in any rotated position, in a round aperture on a charging tray for plural markers. Further exemplary active markers are waterproof.

Timecode Box for Timecode Offset

Further exemplary embodiments provide a phase accurate timecode box, including a micro masterclock in a small, mobile enclosure for placement on individual cameras, for example three different camera systems or groups of equipment, with desired phase adjustment per timecode box to match the different equipment or groups by providing timecode offset up or down.

For example, for three separate cameras, one camera may have one frame of delay, a second camera has two frames of delay and the whole system is off by three, independent adjustment of all three using the exemplary timecode box can correct the problem. Further if inherent error in a given device is known (e.g., of 2 frames for a particular camera), the exemplary timecode box can simply start that equipment off at an offset of two frames, with the rest of the equipment at normal.

In additional exemplary embodiments, a single exemplary timecode box can be used to manually clock other devices (taking, e.g., a couple of seconds per device for the phase of the crystal to align).

In further exemplary embodiments, the timecode box may be used in cross-frame scenarios, for example with a single camera at 30 fps and another at 24 fps, with the two cameras still synchronizing to the zero frames.

Further exemplary embodiments provide a single box to offset both phase accuracy and frame accuracy, along with wireless phase accurate synchronization.

Virtual Cameras

Additional exemplary embodiments provide a virtual camera utilizing a central camera, at least one pivoting hand control and a marker tree. Exemplary described virtual cameras allows navigation through a virtual world (e.g., designed by VAD) and to allow directors to physically direct shots directly during development, shooting on a virtual set, choosing camera angles and allowing directors to visualize in new ways. Further, such exemplary virtual cameras allow producers to see what the director is seeing and to allow the producer to "reshoot" as needed.

Figure 16:
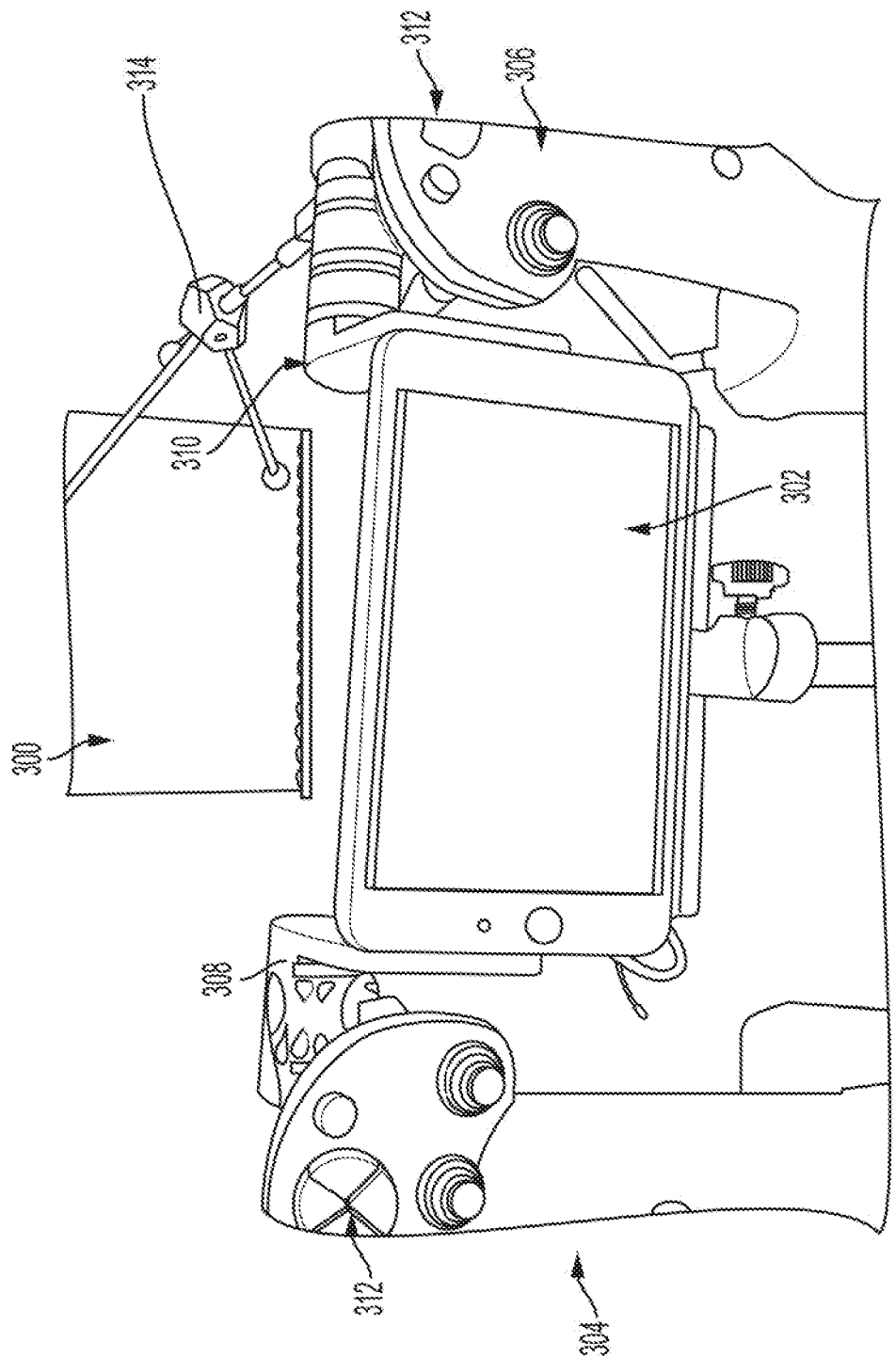
FIG. 16 illustrates a perspective view of an exemplary virtual camera, in accordance with the present disclosure.

FIG. 16 illustrates a top elevation view of an exemplary virtual camera, shown generally at 300. A central display screen 302 corresponding to a virtual camera lens is pivotally attached to one or both handles 304, 306 via pivotable joints 308, 310. Each handle includes control buttons 312, which in exemplary embodiments are freely map-able to any desired function or to any desired custom profile. The virtual camera is represented by an exemplary retroreflective marker tree 314, with the center node designated as the virtual camera lens and tree extensions providing position and orientation information for the virtual camera.

In exemplary embodiments, the marker tree 314 is secured with regard to at least one handle (illustrated as the right handle in FIG. 16) such that manipulation of that handle directly affects the position and orientation of the virtual camera, though in alternate embodiments, the marker tree 314 can be directly affixed to the screen 302. In any event, the device can be treated as modular, using different handles, switching pivot connections, attachment to various devices, such as cranes, etc.

Exemplary embodiments allow a saved virtual start position for every time, provide for assignability of functions to buttons, with functions that are multi-app compatible, provide hot buttons to map or change the layout of a virtual camera (using for example python/script language to facilitate different button press times for different functions), provide controls for any kind of device, e.g., wheels as a gimbal), etc.

In further exemplary embodiments, a pathing space may be specified for playback versus live performance capture, with the ability to push or pull the camera along a path with a joystick and, if desired be free to move the virtual camera around (left, right, etc.) by physically rotating the camera as the camera moves along the path. Additional exemplary embodiments map a joystick control for playback, facilitating scrubbing to different moments in time, in a particular location looking in a particular direction (as one point in a spline). Further exemplary embodiments provide a top view to allow such spline to be viewed as it is being created, that is as the virtual camera is moved to another place in time off to the side, creating a second or additional spline point.

Additional exemplary embodiments provide replay, at a desired speed, with choice to stay on a spline path or to deviate. Further exemplary embodiments permit keying the rotation for any given spline point, so that it will rotate on its own, with an option to further rotate on top of that motion.

Additional exemplary embodiments provide for precisely tracking a virtual camera without jitter (which can be magnified by zoom and which can't be low pass filtered out do to generation of lag). In exemplary embodiments, an inertial measurement unit (IMU) device is provided on the camera that is being fed to the same software that gets the mocap data for the camera, joysticks, etc., which IMU applies a filter to fuse the inertial (the inertial sensor being good in terms of dynamics, measuring rotations, etc. without jitter). An exemplary technique includes use of an extended Kalman filter to fuse motion data from the IMU with positioning data from the optical tracking system.

In further exemplary embodiments, the IMU device is configured to provide a measurement of rates of rotation and linear accelerations, and data is filtered with the optical tracking system positional data to provide an optimal estimation of the motion, position, and rotation parameters of the camera. Further exemplary embodiments fuse both sensors to provide further convergence of virtual and real-time world images.

In additional exemplary embodiments, a motion capture reference camera includes an IMU device configured to embed data directly onto the video stream of said camera, with every frame labeled with frame accurate IMU samples that is extractable from the video feed, the embedded data also including information that uniquely identifies the camera.

In additional exemplary embodiments, a reference camera is provided with an IMU mounted thereon, and with video out, the IMU injects data right onto the video stream of the camera, with every frame labeled with frame accurate IMU data that is extractable from the video feed. When the signal is retrieved, every frame is labeled with the IMU data (which is frame accurate), with the IMU data also being extractable out of the video feed. One aspect injects and the other extracts, with the signal being filterable, using information to calculate the pose of the camera. This reduces cabling (e.g., requiring only coax) and solves the problem of recovering IMU data. Sync is achieved between the frame and the IMU data. In further exemplary embodiments, a tetherless camera using transmitters with metadata of the IMU being placed in the audio channels being transmitted via wife. In additional exemplary embodiments, the video stream can be tagged to identify its source.

Wireless Sync Technology with a Can Bus RF Sync

Exemplary embodiments provide for use of a virtual camera with exemplary encoded cranes, where it is desirable to capture encoders such that they are phase accurate and in sync with other equipment. In exemplary embodiments, wireless phase accurate syncing injects into the can bus, using for example sync messages, to tell message enabled encoders to capture at exactly the same time and to stream data back out to existing software.

Virtual Focus Device and Wheels Box

Figure 17:
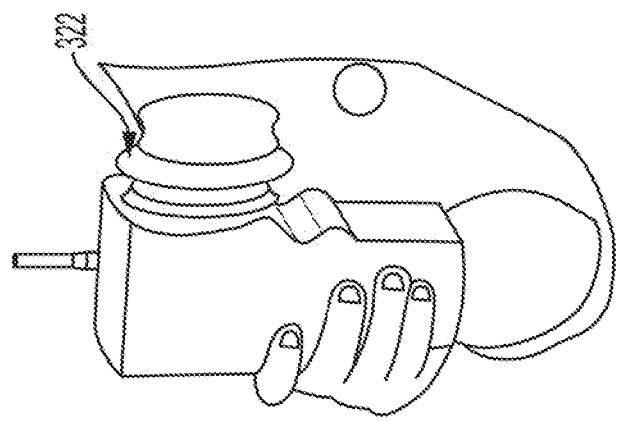
FIG. 17 illustrates a side elevation view of an exemplary wireless focus device, in accordance with the present disclosure.

Additional exemplary embodiments provide an exemplary virtual focus device, shown generally at 320 in FIG. 17. Such device is configured as a handheld, wireless dedicated focus control similar to a focus puller, able to control focus aspects as desired in the system. In exemplary embodiments, such focus device is map-able in the same fashion as the joystick controls of the above-described virtual camera (e.g., another desirable application given the spinning wheel 322 might be as a zoom device).

A further exemplary device is similar to conventional wheels boxes providing traditional wheels boxes controls for translation, tilt and roll, zoom, overall gain, individual gains, but also allowing any kind of button mapping.

It should be emphasized that the above-described example embodiments of the present invention, including the best mode, and any detailed discussion of particular examples, are merely possible examples of implementations of example embodiments, and are set forth for a clear understanding of the principles of the invention. Many variations and modifications may be made to the above-described embodiment(s) of the invention without departing from the spirit and scope of the invention. All such modifications and variations are intended to be included herein within the scope of this disclosure and the present invention.

What is claimed is:

1. A system for virtual production, the system comprising:
   a virtual camera including
      a display having a display screen configured to display a virtual camera lens;
      a first handle connected to the display via a first joint, the first handle including a first plurality of map-able control buttons thereon;
      a second handle connected to the display via a second joint, wherein at least one of the first joint or the second joint is configured to permit relative pivoting of the display; and
      a retroreflective marker tree secured to one of the first handle or the second handle, the retroreflective marker tree virtually representing the virtual camera, wherein the retroreflective marker tree includes a center node designating the virtual camera lens, and further includes tree extensions representing a position and an orientation of the virtual camera.

2. The system in accordance with claim 1, further comprising:
   a motion capture camera provided in a three-dimensional space, the motion capture camera configured to track the virtual camera lens, the position of the virtual camera, and the orientation of the virtual camera.

3. The system in accordance with claim 1, further comprising:
   a processor configured to execute a software to provide a pathing space for playback, including a designated control for movement of the virtual camera along a path, and to further provide a free movement of the virtual camera around the path by a physical rotation of the virtual camera as the virtual camera temporally moves along the path.

4. The system in accordance with claim 3, wherein the processor is further configured to execute the software to replay according to a desired speed, with concurrent options to stay on the path or to deviate from the path.

5. The system in accordance with claim 1, further comprising:
   a processor configured to execute a software to map a joystick control for playback, and to facilitate scrubbing to different moments of time in a particular location looking in a particular direction as one point in a spline.

6. The system in accordance with claim 5, wherein the processor is further configured to execute the software to allow the spline to be viewed while being created, as the virtual camera is moved to another place in time to another point in the spline.

7. The system in accordance with claim 5, wherein the processor is further configured to execute the software to rotate the virtual camera for any given point in the spline.

8. The system in accordance with claim 1, further comprising:
   a motion capture camera; and
   an inertial measurement unit (IMU) device provided on the motion capture camera, wherein the IMU device is configured to provide measurement data of rates of rotation and linear accelerations of the motion capture camera, and the measurement data is filtered with an optical tracking system positional data to provide an optimal estimation of motion parameters, position parameters, and rotation parameters of the virtual camera.

9. The system in accordance with claim 8, wherein the IMU device is further configured to embed data directly onto a video stream of the virtual camera, wherein every frame is labeled with at least one frame accurate IMU sample that is extractable from the video stream, and wherein the embedded data further includes information that uniquely identifies the virtual camera.

10. The system in accordance with claim 8, wherein the IMU device is further configured to inject data directly onto a video stream of the virtual camera, and wherein every frame is labeled with frame accurate IMU data that is extractable from the video stream.

11. A method of using a system for virtual production, the system comprising (a) a virtual camera including a display having a display screen configured to display a virtual camera lens, (b) a first handle connected to the display via a first joint, the first handle including a first plurality of map-able control buttons thereon, (c) a second handle connected to the display via a second joint, wherein at least one of the first joint or the second joint is configured to permit relative pivoting of the display, and (d) a retroreflective marker tree secured to one of the first handle or the second handle, the method comprising:
   virtually representing, using the retroreflective marker tree, the virtual camera, wherein virtually representing the virtual camera includes:
      designating the virtual camera lens by a center node of the retroreflective marker tree; and
      representing a position and an orientation of the virtual camera by tree extensions of the retroreflective marker tree.

12. The method in accordance with claim 11, wherein the system further comprises a motion capture camera provided in a three-dimensional space, the method further comprising:
   tracking, using the motion capture camera, the virtual camera lens, the position of the virtual camera, and the orientation of the virtual camera.

13. The method in accordance with claim 11, wherein the system further comprises a processor configured to execute a software, the method further comprising:
   providing, using the processor executing the software, a pathing space for playback, including a designated control for movement of the virtual camera along a path; and
   providing, using the processor executing the software, a free movement of the virtual camera around the path by a physical rotation of the virtual camera as the virtual camera temporally moves along the path.

14. The method in accordance with claim 13, further comprising:
   replaying, using the processor executing the software, according to a desired speed, with concurrent options to stay on the path or to deviate from the path.

15. The method in accordance with claim 11, wherein the system further comprises a processor configured to execute a software, the method further comprising:
   mapping, using the processor executing the software, a joystick control for playback; and
   facilitating, using the processor executing the software, scrubbing to different moments of time in a particular location looking in a particular direction as one point in a spline.

16. The method in accordance with claim 15, further comprising:
  allowing, using the processor executing the software, the spline to be viewed while being created, as the virtual camera is moved to another place in time to another point in the spline.

17. The method in accordance with claim 15, further comprising:
  rotating, using the processor executing the software, the virtual camera for any given point in the spline.

18. The method in accordance with claim 11, wherein the system further comprises a motion capture camera and an inertial measurement unit (IMU) device provided on the motion capture camera, the method further comprising:
  providing, using the IMU device, measurement data of rates of rotation and linear accelerations of the motion capture camera; and
  filtering, using the IMU device, the measurement data with an optical tracking system positional data to provide an optimal estimation of motion parameters, position parameters, and rotation parameters of the virtual camera.

19. The method in accordance with claim 18, further comprising:
  embedding, using the IMU device, data directly onto a video stream of the virtual camera, wherein every frame is labeled with at least one frame accurate IMU sample that is extractable from the video stream, and wherein the embedded data further includes information that uniquely identifies the virtual camera.

20. The method in accordance with claim 18, further comprising:
  injecting, using the IMU device, data directly onto a video stream of the virtual camera, wherein every frame is labeled with frame accurate IMU data that is extractable from the video stream.

* * * * *